United States Patent Office 2,812,355
Patented Nov. 5, 1957

2,812,355

PREPARATION OF HYDROXYCITRONELLAL

Arthur Lawrence Fox, Short Hills, N. J., assignor to Colgate-Palmolive Company, Jersey City, N. J., a corporation of Delaware No Drawing. Application October 11, 1954,
Serial No. 461,660

5 Claims. (Cl. 260—602)

This invention relates to a process for the preparation of hydroxycitronellal. More particularly, the invention relates to a new and improved process for the preparation of this compound in which greatly improved yields of the desired product are obtained.

Hydroxycitronellal is well known as a useful compound of commerce, particularly in connection with the perfume art, e. g., see Luthy et al. U. S. Patent No. 2,265,437. Various methods of producing hydroxycitronellal are known, for example, see Meuly U. S. Patent No. 2,235,840 and Flisik et al. U. S. Patent No. 2,306,332. One of the more common ways of preparing hydroxycitronellal is by a procedure which involves the formation of a bisulfite addition compound of citronellal by reacting the latter with an alkali metal bisulfite such as sodium bisulfite, effecting hydration at the double bond of the citronellal portion of the resulting addition compound, such as in the presence of sulfuric acid, and treating the resulting bisulfite addition compound of hydroxycitronellal so as to remove the bisulfite portion and thus liberate the free hydroxycitronellal. The prior art cited above is illustrative of such a method.

However, the synthesis of hydroxycitronellal by the foregoing method is at best a difficult one, and is generally productive of the desired compound only in rather poor over-all yields, due to erratic results and low yields obtained from the hydration step proper. Thus, in a series of eight experiments employing these prior art methods, or only minor variants thereof, the average yield from the hydration step itself was only about 37%, the individual results ranging from a low of 10% to a high of 71%.

One of the principal objects of the present invention, therefore, is to provide a new and improved process for the production of hydroxycitronellal by a method which will permit of substantially improved yields in a reproducible, i. e., consistent, manner. More particularly, a further object of the present invention is to provide a new and improved method that includes the novel step of effecting the hydration of the citronellal-bisulfite adduct to the hydroxycitronellal-bisulfite adduct in a manner which will permit the ultimate recovery of the desired hydroxycitronellal with reproducible yields of the order of 65% or more of theoretical.

The manner in which these and other objects and features of the invention are attained will appear more fully from the following description thereof, in which reference is made to typical and preferred procedures in order better to indicate more fully the nature of the invention but without intending to limit the invention thereby.

According to the present invention, the hydration step is carried out in the presence of liquid sulfur dioxide, preferably but not necessarily while the bisulfite adduct is dispersed in a suitable organic solvent for hydroxycitronellal such as toluene. Any suitable solvent may be employed so long as it is inert and substantially water-immiscible, its purpose being to extract or aid in extracting the product hydroxycitronellal from the aqueous hydration reaction medium containing sulfuric acid. Benzene, toluene and xylene are additional examples of suitable solvents for the purpose.

In order still more fully to indicate the nature of the present invention, the following example of typical procedure is set forth, it being understood that this description is presented by way of illustration only and not as limiting the scope of the invention.

The citronellal-bisulfite addition compound employed in the practice of this invention may be prepared in any desired manner. For example, technical citronellal (82% citronellal) is reacted with sodium bisulfite in the form of a 30% aqueous solution at room temperature, thereby resulting in a citronellal-bisulfite adduct of 87% purity. If desired, the initial technical citronellal may be first purified by distillation and the adduct-forming reaction may thereafter be carried out in the presence of an inert water-miscible solvent such as methanol for convenience in handling the reaction mixture.

The citronellal-bisulfite adduct is separated and dried and thereafter ground to a white powder. 100 grams of the dry, ground adduct are suspended in 200 ml. of toluene and the mixture cooled to $-10°$ C. 200 ml. of liquid sulfur dioxide are then added to the reaction mixture and the mixture placed in a reaction vessel fitted with a Dry-Ice reflux condenser. 200 ml. of 50% sulfuric acid are then added to the reaction mixture with stirring. Agitation of the reaction mixture is continued for five hours while holding the temperature at a value between 0° and $-10°$ C. At the end of this time the sulfur dioxide is removed under slightly reduced pressure, the temperature not being allowed to rise above 0° C., and the mixture is then neutralized with solid sodium carbonate. 70 ml. of a 36% formaldehyde solution in water are added to regenerate the hydroxycitronellal from its bisulfite addition compound, and the mixture is stirred for three hours. Agitation is discontinued and the reaction mixture is permitted to remain quiescent with resulting layer formation. The layers are separated and the aqueous phase is extracted with four 100-ml. portions of toluene. The toluene extracts are combined and the toluene is then removed by distillation. The residual material is vacuum-distilled and 45.6 grams of hydroxycitronellal (B. P. 91° C./0.2 mm. Hg) are thereby obtained, representing a yield of 69% of theoretical. The resulting hydroxycitronellal is in highly purified form and as such is eminently suited for use at a perfume ingredient.

While the hydration of the citronellal-bisulfite adduct has been described above as being conducted in the presence of sulfuric acid, it will be appreciated that other suitable reagents may be employed to assist the hydration reaction such as other strong acids, including hydrochloric acid.

Moreover, it will be understood that instead of employing solid sodium carbonate to neutralize the residual acid content of the reaction mixture, other alkaline compounds may also be employed such as sodium hydroxide, potassium carbonate, etc.

The regeneration of the parent aldehyde from the aldehyde-bisulfite adduct may also be brought about otherwise than by the addition of aqueous formaldehyde as indicated above in the working example. For instance, the regeneration of the parent aldehyde may be brought about by reacting the adduct with other bisulfite acceptors such as acetaldehyde.

Instead of employing toluene to extract the hydroxycitronellal from the final reaction mixture, other solvents such as benzene and xylene may be employed as indicated above.

It will be apparent that many changes and modifications of various features of the process described herein may be made without departing from the spirit and scope of the invention. It is therefore to be understood that the foregoing description is by way of illustration of the invention rather than limitation upon the invention.

What is claimed is:

1. A process of making hydroxycitronellal from citronellal which comprises: reacting citronellal with sodium bisulfite to form a citronellal-bisulfite adduct to protect the aldehyde group during ensuing reactions; suspending said adduct in toluene; adding liquid sulfur dioxide at atmospheric pressure to the resulting suspension; forming hydroxycitronellal-bisulfite adduct by hydrating the citronellal-bisulfite adduct at the double bond with aqueous sulfuric acid hydrating agent in the presence of said solvent and liquid sulfur dioxide, the hydration step being conducted over a period of about five hours at a temperature between $0°$ C. and $-10°$ C. while the hydration mixture comprising adduct, toluene, liquid sulfur dioxide and aqueous sulfuric acid is being mixed, meanwhile condensing and returning to the hydration mixture during the period of the hydration step sulfur dioxide that vaporizes; removing the sulfur dioxide from the hydration mixture by evaporating it off; neutralizing excess acidity of the remaining mixture; converting the hydroxycitronellal-bisulfite adduct to hydroxycitronellal by reacting it with aqueous formaldehyde; and recovering the hydroxycitronellal made.

2. A process of making hydroxycitronellal from citronellal which comprises reacting citronellal with an alkali metal bisulfite to form a citronellal-bisulfite adduct, suspending said adduct in an inert aromatic hydrocarbon solvent for hydroxycitronellal, admixing liquid sulfur dioxide with said suspension, forming hydroxycitronellal-bisulfite adduct by hydrating the citronellal-bisulfite adduct at the double bond in the presence of said solvent and liquid sulfur dioxide with aqueous strong acid hydrating agent, the hydration being conducted at a temperature below $0°$ C. while maintaining the liquid sulfur dioxide dispersed in the hydration reaction mixture in the liquid state, removing the sulfur dioxide, neutralizing the remaining mixture, converting the hydroxycitronellal-bisulfite adduct to hydroxycitronellal and recovering the hydroxycitronellal.

3. A process of making hydroxycitronellal from citronellal which comprises converting citronellal to citronellal-bisulfite adduct, mixing said adduct with an inert organic solvent for hydroxycitronellal, admixing liquid sulfur dioxide with said mixture, forming hydroxycitronellal-bisulfite adduct by hydrating the citronellal-bisulfite adduct at the double bond with aqueous sulfuric acid in the presence of the solvent and liquid sulfur dioxide, converting the hydroxycitronellal-bisulfite adduct to hydroxycitronellal and recovering the hydroxycitronellal.

4. A process of making hydroxycitronellal from citronellal which comprises converting citronellal to citronellal-bisulfite adduct, mixing said adduct with a water-immiscible inert organic solvent for hydroxycitronellal, admixing liquid sulfur dioxide with said mixture, hydrating the citronellal-bisulfite adduct at the double bond with aqueous hydrating agent in the presence of the solvent and liquid sulfur dioxide to form hydroxycitronellal-bisulfite adduct, converting said adduct to hydroxycitronellal and recovering the hydroxycitronellal.

5. A process of making hydroxycitronellal which comprises making citronellal-bisulfite adduct, admixing liquid sulfur dioxide with the citronellal-bisulfite adduct and hydrating said adduct with aqueous hydrating agent in the presence of liquid sulfur dioxide, to form hydroxycitronellal-bisulfite adduct, converting said adduct to hydroxycitronellal and recovering the hydroxycitronellal.

References Cited in the file of this patent

UNITED STATES PATENTS

| | | |
|---|---|---|
| 2,235,840 | Meuly | Mar. 25, 1941 |
| 2,245,377 | Ziese | June 10, 1941 |
| 2,306,332 | Flisik et al. | Dec. 22, 1942 |